April 26, 1932.  R. S. ROBERSON  1,855,651
COMBINED SPIRIT LEVEL AND INDICATOR
Filed Aug. 6, 1928  3 Sheets-Sheet 1
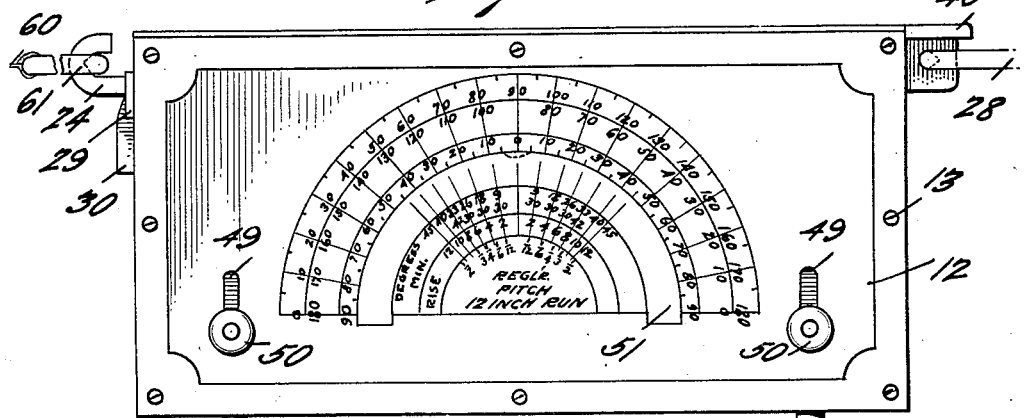
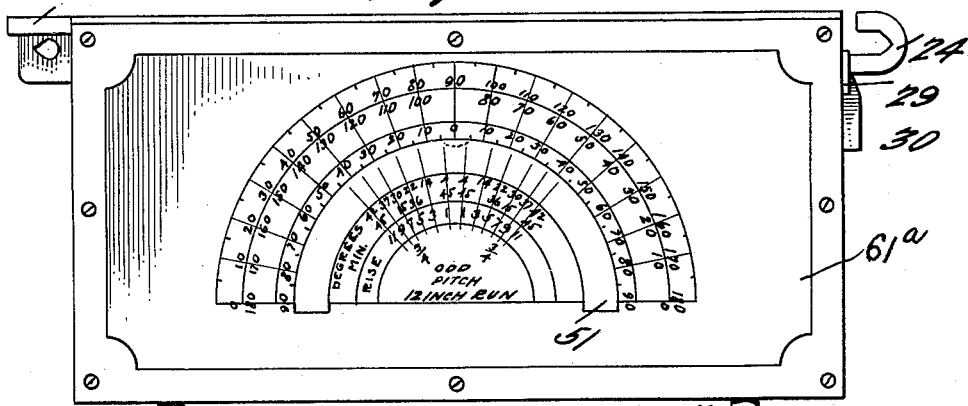
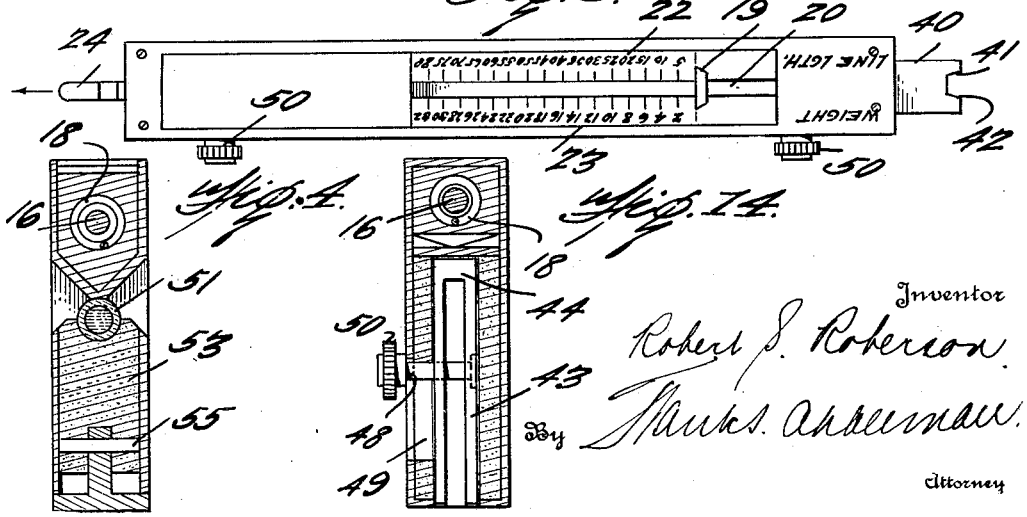
Inventor
Robert S. Roberson
By Hanks Anderman
Attorney April 26, 1932. R. S. ROBERSON 1,855,651
COMBINED SPIRIT LEVEL AND INDICATOR
Filed Aug. 6, 1928  3 Sheets—Sheet 2
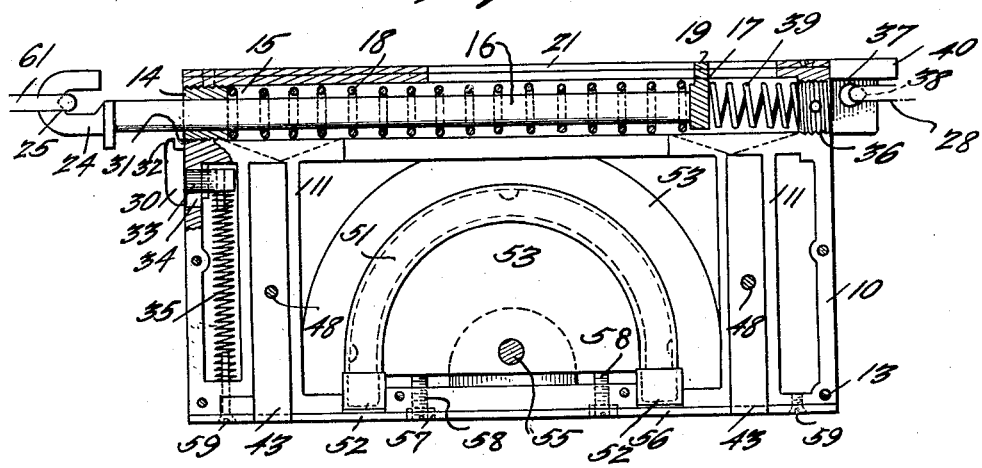
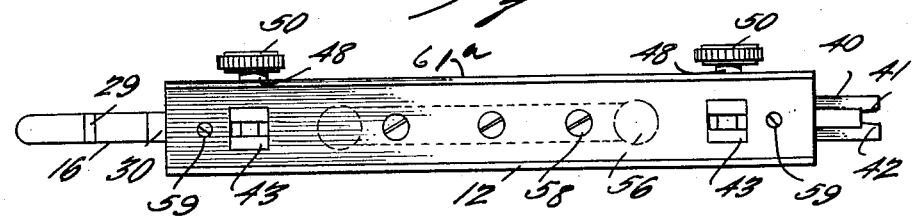
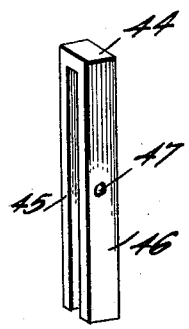
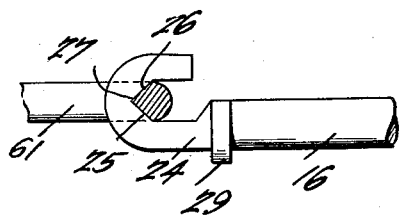
INVENTOR.
Robert S. Roberson,
BY
ATTORNEY.

April 26, 1932. R. S. ROBERSON 1,855,651
COMBINED SPIRIT LEVEL AND INDICATOR
Filed Aug. 6, 1928 3 Sheets-Sheet 3
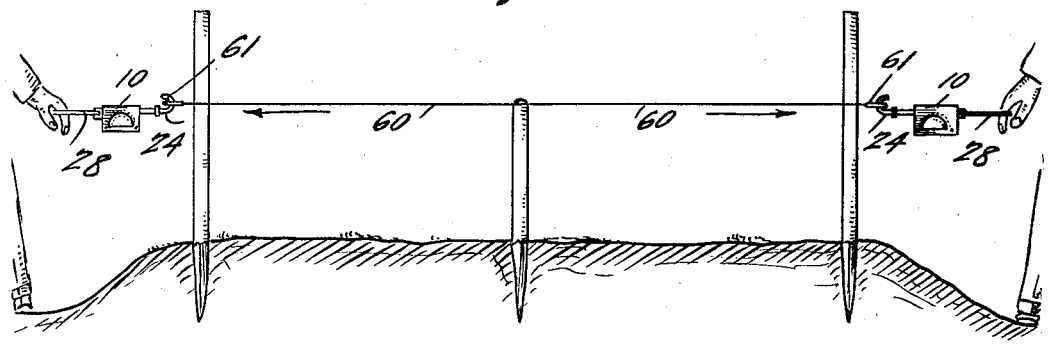
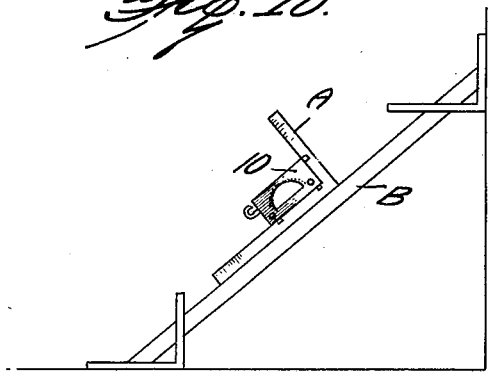
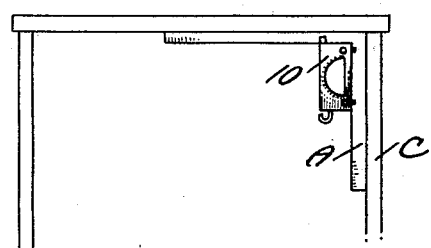
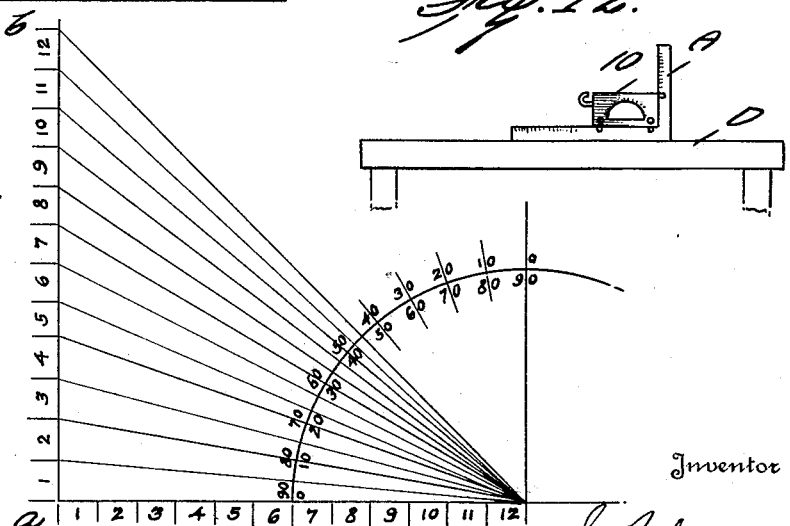
Inventor
Robert S. Roberson
By Frank T. Ankerman
Attorney Patented Apr. 26, 1932

1,855,651

UNITED STATES PATENT OFFICE

ROBERT S. ROBERSON, OF TUSCALOOSA, ALABAMA

COMBINED SPIRIT LEVEL AND INDICATOR

Application filed August 6, 1928. Serial No. 297,639.

This invention relates to a combination tool or implement comprising a line and spirit level, an indicator and protractor and has for an object the production of a device capable of use in a plurality of ways to impart useful information with respect to levels, pitches, runs and rises, and when used in association with an ordinary square is of utility in squaring and plumbing window frames, leveling sills and the like.

It has been found in practice that the device is capable of use in connection with foundation work and for determining inclines where rafters and braces are to be frames, and in determining pitches of roofs with the rise and run of rafters on a framing square, and indicating pitches, within predetermined bounds.

It is a further object of this invention to produce novel means for holding the level implement and protractor in assembled relation to a square when certain operations in the use of the device are being performed, and also to provide means which may be associated with lines or flexible measures and with supports for determining levels and plotting for excavations or fills, or in determining the levels of foundations.

It is a still further object to produce an instrument which includes means of the character indicated and having in combination a plurality of means of novel construction, the unit resulting in increased efficiency and versatility.

With the foregoing and other objects in view, the invention consists in the details of construction, and in the arrangement and combination of parts to be hereinafter more fully set forth and claimed.

In describing the invention in detail, reference will be had to the accompanying drawings, forming part of this application, wherein like characters denote corresponding parts in the several views, and in which—

Figure 1 illustrates a view in side elevation of a tool having a spirit level and its attachments, constructed to accord with the invention;

Figure 2 illustrates the reverse side of the tool;

Figure 3 illustrates a plan view thereof;

Figure 4 illustrates a transverse sectional view centrally of the said device;

Figure 5 illustrates a longitudinal vertical sectional view of the same;

Figure 6 illustrates an underneath plan view thereof;

Figure 7 illustrates a perspective view of a detail of the device;

Figure 8 illustrates a detail of the connection between a draw-bar and a pull therefor;

Figure 9 illustrates the manner of use of the invention for determining grades;

Figure 10 illustrates the use of the invention in association with a square for plotting rises and runs;

Figure 11 illustrates the application of the invention in use for squaring and plumbing frames;

Figure 12 illustrates the use of the invention associated with a square for leveling sills or the like;

Figure 13 illustrates the manner of figuring rises and runs; and

Figure 14 illustrates a vertical sectional view of one end of the instrument.

In the present embodiment of the invention, the inner frame or housing 10 is of skeleton formation, with a plurality of partitions or webs, such as 11, which divide the interior of the housing into a plurality of compartments for holding elements of the device, as will presently appear. Since the size and, to some extent, the configurations of the webs and their spacing with relation to one another may be changed to suit particular requirements and the sizes of the elements that they are to contain, it is believed unnecessary to describe these features with any greater degree of particularity.

A face plate or closure 12 is applied to one side of the housing and it may be secured in place by fastenings 13, such as screws, rivets, or the like, although, preferably the fastening should be removable for the purpose of permitting ready access to the interior of the housing.

A bushing or bearing 14 is threaded in an aperture at the end of the casing and a channel 15 is formed as a continuation of the aperture in which the bushing is threaded, and a draw-bar 16 is slidable in the bushing and projects into the channel. The draw-bar has a shoulder or follower 17 on its inner end and this engages a spring 18 which is coiled around the draw-bar, one of the ends of the spring abutting the bushing 14, and the said shoulder has an indicator 19 which is free to travel in a slot 20 formed in a plate 21 secured on top of the inner frame or housing. The indicator is elongated transversely of the plate and is to act in conjunction with two sets of graduations 22 and 23, respectively, the former indicating "feet" and the latter indicating "pounds", although this is rather an arbitrary designation for these graduations, as a description of the operation of the device will disclose. The draw-bar at its outer end is provided with a connection 24 which is here illustrated as a hook having internally converging surfaces 25 and 26 which at their juncture constitute a pivot 27 for a coupling, such as a ring 61, to which a line 60 is connected. The draw-bar is further provided with a lug 29 to be engaged by the keeper of a latch 30 when said lug is in the space 31 between the lip 32 of the latch and the end of the housing.

The latch 30 has a shank 33 slidable in a slot 34 in the end wall of the housing and the said shank projects into one of the compartments in the housing where it is engaged by a spring 35, whose function is to force the latch upwardly, holding it yieldingly in the path of travel of the lug 29.

The opposite end of the casing is provided with a plug 36 which is threaded in the end of the housing opposite the bushing 14 and this plug carries an apertured flange 37. The outer wall of the aperture 38 through this flange has a configuration similar to that of the configuration of the inner surface of the element 24. A shock absorbing or cushioning spring 39 is interposed between the plug 36 and the follower and it will absorb jar or concussion, due to the action of the spring 18, and when the draw-bar is released when the spring 18 is under compression, the spring will move the draw-bar so that its indicator will be at zero. The outer surface of the lip 32 is shaped to form a cam or inclined surface over which a catch or lug 29 will ride when the bar is forced inwardly and to release the bar the latch is manually moved out of engagement with the catch and will be held in retracted position by the spring 39.

The top plate 21 has an extension 40 at one end and this extension has a slot in its end with converging walls or edges 41 and 42 which produce a recess or clearance which is gradually diminished in width toward the inner end of the slot, and this is intended to provide a seat for a blade of a square when the device is used in association with a square, as will presently appear.

The device is further provided with bifurcated bars or what might be termed legs 43 of identical construction and these may be used for supporting the housing either on a plane or on an incline, or in association with a tri-square.

Preferably these so-called bars or legs are each slidable in the compartments of the housing and they are intended to be projected beyond the bottom of the housing when they are employed. Otherwise they are nested or secured in the housing as they appear in Fig. 5 of the drawings. These elements 43 are preferably constructed of resilient metal and each of the legs has a cross head 44 and parallel extensions 45 and 46, one of the extensions having an aperture, such as 47. A clamping bolt 48 extends therethrough and through a slot 49 in the plate 12. A nut 50 is threaded on the bolt and the head of the bolt engages the extension remote from the nut, so that when the nut is threaded on the bolt to engage the face plate, the bolt will serve to bind the members for frictionally retaining them in their seats, or to adjust the ends of the extensions in order that they may be clamped against the sides of the blade of a square. It is the purpose of the inventor that the legs shall adjustably and frictionally engage the sides of a blade of a square to such degree as to aid in retaining the square and level assembled.

A curved glass or transparent tube 51 is located in a compartment at the center of the housing and it is the purpose of the inventor that this tube should contain spirits, such as usually used in tubes of spirit levels. Preferably the ends of the tube are stopped with cork, as at 52 and the ends of the tube and the stoppers are encased by metal caps used to force a stopper within the tube and to have an air bubble of a minimum size therein.

Preferably the tube is seated in a plastic arch 53 which will harden after it is shaped, in order that it will act as a stabilizer and a protector for the tube. The supporting frame of the curved arch has a recess in its bottom and the arch is mounted on a pivot 55 in order that it may be adjusted. A bottom plate 56 is secured in the housing and it has apertures 57 through which screws 58 are threaded, and the ends of the screws bear against the arched frame on each side of the pivot 55. The screws aid in holding the arch in place. The bottom plate 56 will, of course, be secured to the housing by suitable fastenings 59, such as screws or the like. The bottom plate has a post or flange which extends in to the recess which is intersected by an aperture to receive the pivot 55.

The ring 28 at the end of a surveyor's chain is intended to act as a hand grasp when the device is to be employed for plotting levels, a line, tape or chain 60 being connected to a hook 24 through the employment of a ring 61, as shown by Fig. 9 of the drawings.

The face plates 12 and 61ª of the instrument are applied to the sides of the housing and the plates are provided with graduations with relation to which the bubble of the spirit level and the said graduations are located in outlined spaces, the lines being concentric with the curved tube or the center bolt 55. The outer surface of the side plate 12 and the outer surface of the side plate 61 each has a plurality of concentrically and radially arranged numerals and indicia denoting degrees. The indicia on the surface of the plate 12 may be used in plotting and contains figures and spacings of an ordinary protractor scale on one side and the opposite side plate 61ª may be used in plotting and the figures thereon denote an "odd pitch" or intermediate angle, as partially indicated upon the plan views, Figures 1 and 2. Each of the scales just mentioned are intended for a twelve inch run.

The illustration in Fig. 9 is for the purpose of disclosing the use of the invention for determining levels in association with stakes or posts and, in this illustration, the line 60 is attached to a center stake or post and other posts are located a suitable distance therefrom. The connecting surfaces of the rings and the elements to which they are attached are edged to form fulcrums for the purpose of affording free movement.

The line should extend two or three inches past the stakes remote from the center stake and the tension of the line should be of sufficient force to compress the spring as the draw-bar is moved outwardly. Pull in association with each stake should result in moving the indicator to the same graduation for each stake and the outer stake may be the same distance from the center stake. In operation, the pull on the line or chain 60 should result in the indicator 19 being at the same graduation for each stake, the readings on the scales being identical. In other words, assuming that the graduations are for pounds, the pull exerted should be for the same number of pounds for each indicator and the bulb in the curved glass tube should be read to determine the level for a foundation, and when these two readings coincide, the point where it crosses the stake should be marked to indicate the level. It is, of course, not necessary that the scale or the graduations should be a unit of measure, as that may be arbitrary as used in leveling rods or poles.

In Fig. 10, the spirit level or measuring device is illustrated in use with a square A and the square is placed on a brace B for figuring rises and runs.

In Fig. 11, the square A and the device embodying the invention is shown associated with a window frame C.

In Fig. 12, the square A is shown associated with the device embodying the invention as in use when leveling sills, beams or the like, identified by the letter D.

I claim:

1. A vertical and horizontal angle measuring implement comprising an elongated body provided at one end with an extension having a recess, and at right angles to said extension with bifurcated slides which are adjustable beyond one of the longitudinal edges of the body, and means for allowing adjustment of the bifurcated slides.

2. In a measuring implement having an elongated body, the sides of the body having protractors scaled for regular and odd pitches the body having at one end a notched extension, and at right angles to said extension a pair of bifurcated and adjustable members, and means for maintaining the said members at right angles to the aforesaid notched projection, a curved spirit level between the sides, the bubble of which will indicate upon the scale of the protractor odd and even pitches to accord with the scale of a square.

3. A clinometer comprising an elongated body having on opposite sides graduated scales, a curved spirit level maintained between the sides of the body, the bubble of the spirit level being visible from either of the sides of said body, a pair of bifurcated bars which are slidably associated with the body to be projected and held with their ends beyond the plane of the base of the body, means for holding the bifurcated bars at different positions of adjustment, and a rigid extension having a bifurcated end portion that extends beyond one of the upper corners of the said body.

ROBERT S. ROBERSON.